(12) United States Patent
Joseph (10) Patent No.: US 7,086,228 B2
(45) Date of Patent: Aug. 8, 2006

(54) MASTER BRAKE CYLINDER WITH OPPOSING PISTONS

(76) Inventor: Oscar Matthew Joseph, 63/257 Oxford Street, Bondi Junction, NSW 2022 (AU)

( * ) Notice: Subject to any disclaimer, the term of this patent is extended or adjusted under 35 U.S.C. 154(b) by 106 days.

(21) Appl. No.: 10/481,310

(22) PCT Filed: Jul. 3, 2002

(86) PCT No.: PCT/AU02/00878

§ 371 (c)(1),
(2), (4) Date: Oct. 21, 2004

(87) PCT Pub. No.: WO03/011667

PCT Pub. Date: Feb. 13, 2003

(65) Prior Publication Data

US 2005/0088038 A1    Apr. 28, 2005

(30) Foreign Application Priority Data

Jul. 27, 2001  (AU) ...................... PR6655

(51) Int. Cl.
*B60T 11/20* (2006.01)

(52) U.S. Cl. ..................... 60/562; 91/216 R (58) Field of Classification Search ............. 60/562; 91/215, 216 R, 217, 216 A, 216 B; 92/120
See application file for complete search history.

(56) References Cited

U.S. PATENT DOCUMENTS

| 2,516,495 | A | * | 7/1950 | Waterson | ................... 91/216 A |
| 3,513,655 | A | * | 5/1970 | Reznicek | ...................... 60/562 |
| 4,117,681 | A | * | 10/1978 | Falk | ............................ 60/562 |
| 4,161,105 | A | | 7/1979 | Hagiwara | |
| 4,305,624 | A | | 12/1981 | Belart et al. | |

FOREIGN PATENT DOCUMENTS

DE    29 49 713 A1    6/1981
GB       1403149     10/1973

* cited by examiner

*Primary Examiner*—Thomas E. Lazo
(74) *Attorney, Agent, or Firm*—Knobbe, Martens, Olson & Bear, LLP (57) ABSTRACT

A Master Brake Cylinder with Opposing Pistons providing dual or tandem hydraulic systems that are completely separate and individual, comprising a longitudinally floating main cylinder body with single open bores at opposite ends and a common solid closed dividing wall, two piston assemblies when acted upon by an external push-rod force produce hydraulic fluid pressure and displacement for the actuation of brake calipers and/or drum brakes, so connected to each individual hydraulic system, a plurality of springs means positioned within or without of the cylinder bores to return the pistons to their release positions, a retaining mechanism for retaining pistons within their bores, an outer carrier mechanism to provide support for the brake cylinder and a reaction location for application of the opposed secondary pistons to slide within its bore.

14 Claims, 7 Drawing Sheets

MASTER BRAKE CYLINDER WITH OPPOSING PISTONS

RELATED APPLICATIONS

This application is the U.S. National Phase of PCT/AU02/00878 filed Jul. 3, 2002 and claims priority to Australian Provisional Patent Application No. PR6655 filed Jul. 27, 2001, which are hereby incorporated herein by reference in their entirety.

BACKGROUND OF THE INVENTION

1. Field of the Invention

This invention relates to master cylinders for hydraulic brake systems for vehicles and in particular, to a divided master cylinder constructed with dual opposing pistons whereby if one of the sides of the master cylinder or the hydraulic circuit componentry, seals, or hoses should fail, the other side of the master cylinder and its corresponding hydraulic circuit will maintain the braking operation.

2. Description of the Related Art

A major problem with braking systems for motor vehicles and like vehicles is the failure of hydraulic pressure due to seal leaks, hose failure and the like whereby due to the lack of hydraulic pressure the brakes are unable to operate in an effective manner. Such lack of operation can be catastrophic and lead to fatalities.

There have been many proposals to alleviate brake failures by a variety of methods which are complicated and costly, however, it is believed that none of these methods provide sufficient reliability to help avert brake failure.

A major disadvantage of currently manufactured tandem brake master cylinders is the length of cylinder body housing. This is both costly to manufacture as well as encroaching on limited engine compartment space. Current designs also use a single sliding elastomeric rubber seal to divide the primary and secondary sections. The use of such a seal results in increased pedal travel due to seal compression and deflection and reduced secondary section output pressure due to frictional losses. One further possible drawback is that in the unlikely event of two problems arising simultaneously, such as a hose failure and the dividing seal failure, total loss of brake fluid could occur with corresponding total loss of vehicle braking.

SUMMARY OF THE INVENTION

It is an object present invention to provide a master brake cylinder with opposing pistons which provides an arrangement which assists in alleviating brake failure. At the very least, the invention provides an alternative to presently known master cylinders.

According to the present invention, there is provided a brake cylinder apparatus for vehicles, said brake apparatus having a cylinder with at least two sections with at least two separate delivery connections, at least two pistons being displaced by the action of an operational means, whereby if there is a failure in one of the cylinders and/or delivery connections or braking components, the action of the remaining pistons in communication with the remaining delivery connections maintains hydraulic pressure to the brakes of the vehicle.

The two sections of the cylinder are separated by a solid dividing wall whereby the two pistons are each located in a separate section with each section having a delivery connection associated therewith.

Preferably, the pistons are operated by the action of a brake pedal which transmits mechanical force, often with the assistance of a brake booster, so the piston's whole force creates hydraulic pressure which communicates with disc brake calipers and/or drum brakes associated with the vehicle wheels such that each delivery connection is connected via a divided system applicable to the particular vehicle type.

In the preferred form of the invention, the master brake cylinder with opposing pistons includes a main body portion being generally slidingly received and supported and being able to float longitudinally. The main body portion of the cylinder includes the two sections of the tandem cylinder divided by the dividing wall. These two sections are commonly known as the primary and secondary sections, within which there is a primary and secondary piston associated.

The main body support system can also include a reaction beam, which forms the reaction point for the secondary piston. In its simplest form it may be an adjustable or fixed stop, depending on the preferred method of construction.

Preferably a first one of the pistons received in a first one of the sections, usually known as the primary section, is operated by a first push rod associated with the brake pedal and a second one of the pistons received in a second one of the two sections, usually known as the secondary section, and having its action opposed to the action of the first piston, the second piston being operated by a second push rod received at the opposite end by the reaction beam as the main body slides longitudinally against the second push rod following operation of the brake pedal.

It is seen that due to the action of the two opposed pistons that if one of the hydraulic systems associated with two separate sections of the cylinder fails, the action of the other hydraulic system section ensures continuity of hydraulic pressure to that section of the braking system to which it communicates.

BRIEF DESCRIPTION OF THE DRAWINGS

To assist with understanding the invention, reference will now be made to the accompanying drawings which show embodiments of the invention.

DETAILED DESCRIPTION OF THE PREFERRED EMBODIMENT

Figure 1:
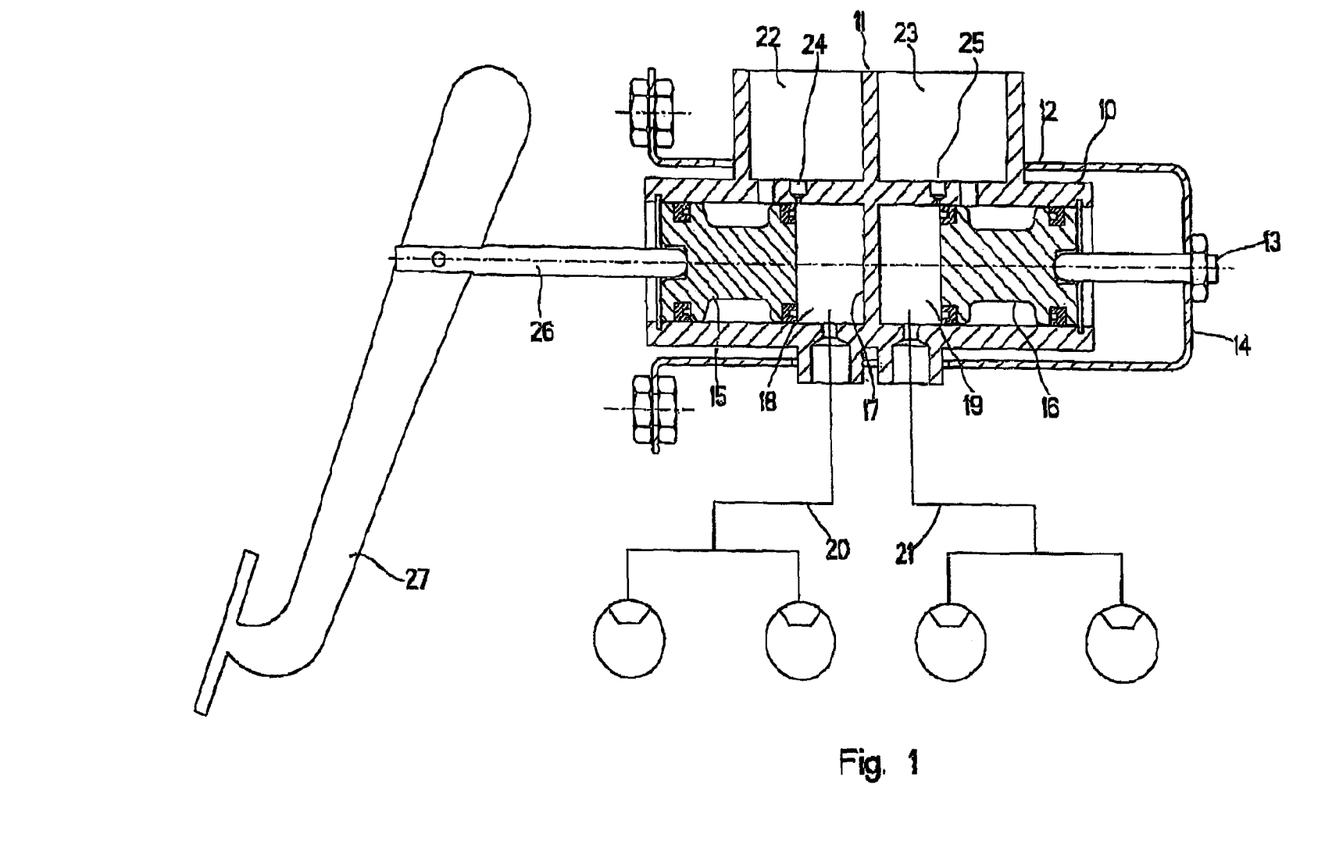
FIG. 1—FIG. 1 is a cross-section side view schematic of the master brake cylinder with opposing pistons, according to a preferred embodiment of the invention.

A preferred embodiment of a brake cylinder apparatus 10 of the present invention as seen in FIG. 1 includes a main portion 11 which is slidingly received within an outer carrier 12 which is preferably bolted to a firewall or a brake booster within the engine compartment of a motor vehicle (not illustrated).

The outer carrier 12 has an adjustable screw 13 partially received within its distal end 14, the amount of the screw 13 protruding into the outer carrier 12 being adjustable in length.

The main portion 11 of the apparatus 10 has two opposed piston assemblies 15 and 16 with a dividing wall 17 therebetween such that there are opposed cylinder sections 18 and 19 each with delivery connection outlets 20 and 21 respectively. The delivery connection outlets 20 and 21 are connected to the brake caliper/drums such that each of the outlets 20 and 21 connect to all four wheels in known arrangements.

Hydraulic fluid containers 22 and 23 are shown associated with the two sections 18 and 19 with inlets 24 and 25 being used to fill the two sections 18 and 19 with hydraulic fluid from the containers 22 and 23.

The piston assembly 15 is operable by a push rod 26 mechanically linked to a brake pedal 27. The opposing piston assembly 16 is operable by action against the adjustable screw 13 as it abuts against it, the screw 13 acting as the push-rod.

The apparatus 10 operates such that when the apparatus is set up, the push-rod 26 acts against the piston assembly 15 and when during such action, the main portion 11 slides within the outer carrier 12, where the adjustable screw 13 bottoms against the piston assembly 16 forming the two cylinder sections 18 and 19.

Upon application of the brake pedal 27 in normal operation, the both piston assemblies operate in unison as the inner portion 11 floats with the carrier 12. If there is a piston or seal failure in the assemblies 15, the piston assembly pushes against the dividing wall 17 thus pushing the main portion 11 within the carrier 12 against the adjustable screw 13 thus maintaining hydraulic pressure via the delivery connection outlet 21.

Likewise, if there is a piston or seal failure in the assembly 16, the piston assembly bottoms and pushes against the other side of the dividing wall 17 thus the piston 15 maintains hydraulic pressure via the delivery connection outlet 20.

Figure 2:
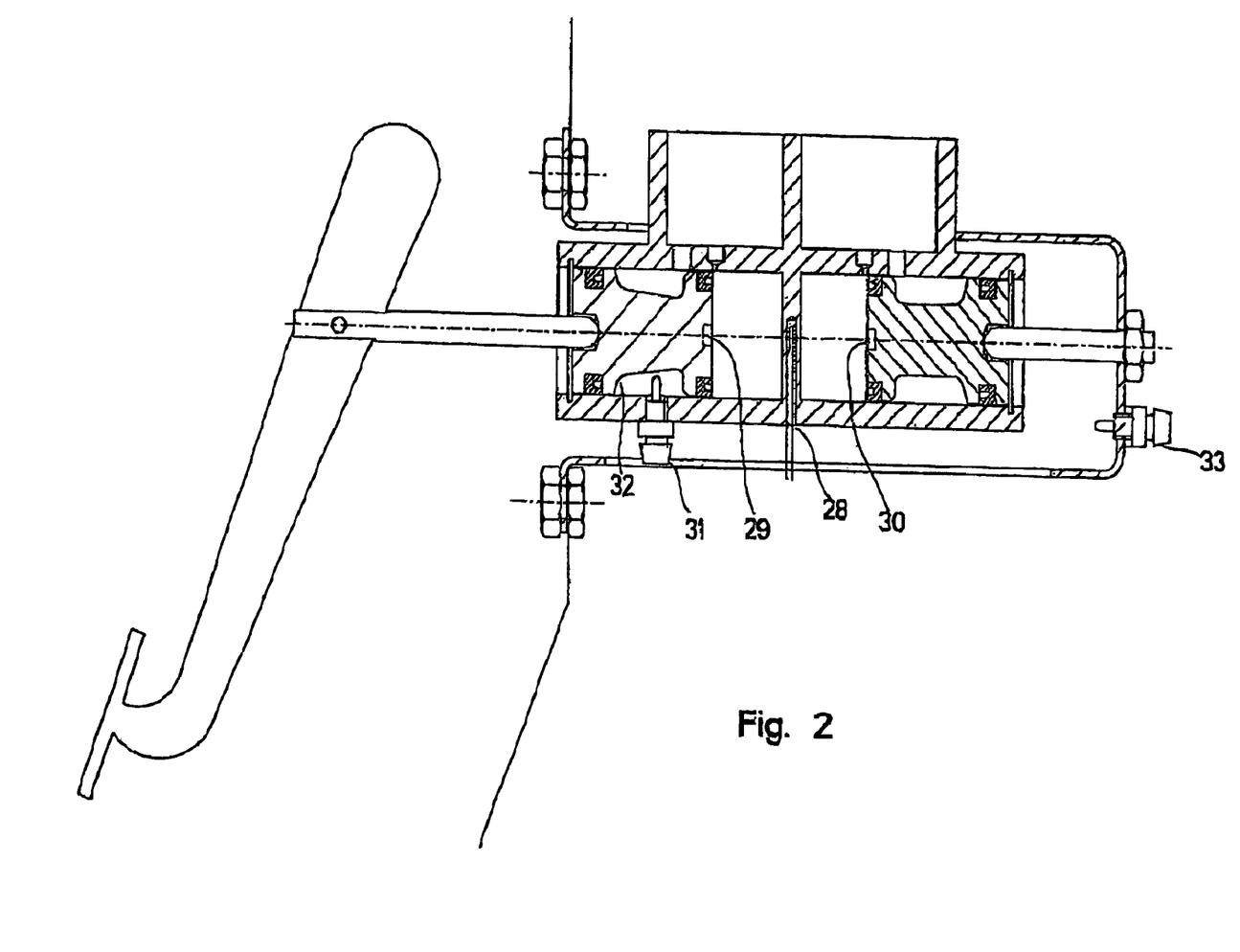
FIG. 2—FIG. 2 shows two optional methods of partial system failure indication.

FIG. 2 shows optional methods of partial system failure indication. One system employs a magnetically operated reed switch 28 with magnets 29 and 30 placed in the ends of the primary and secondary pistons respectively. Should either system fail due to a hydraulic leakage within that system, then upon application of the brake pedal the associated piston will bottom in the bore and activate the reed switch.

An alternate partial system failure indication method employs two spring-loaded contact type switches 31 and 33 positioned such that when either system fails, switch 31 is operated by ramp on piston 32 and switch 33 is operated by the longitudinal displacement of the main body 11.

Figure 3:
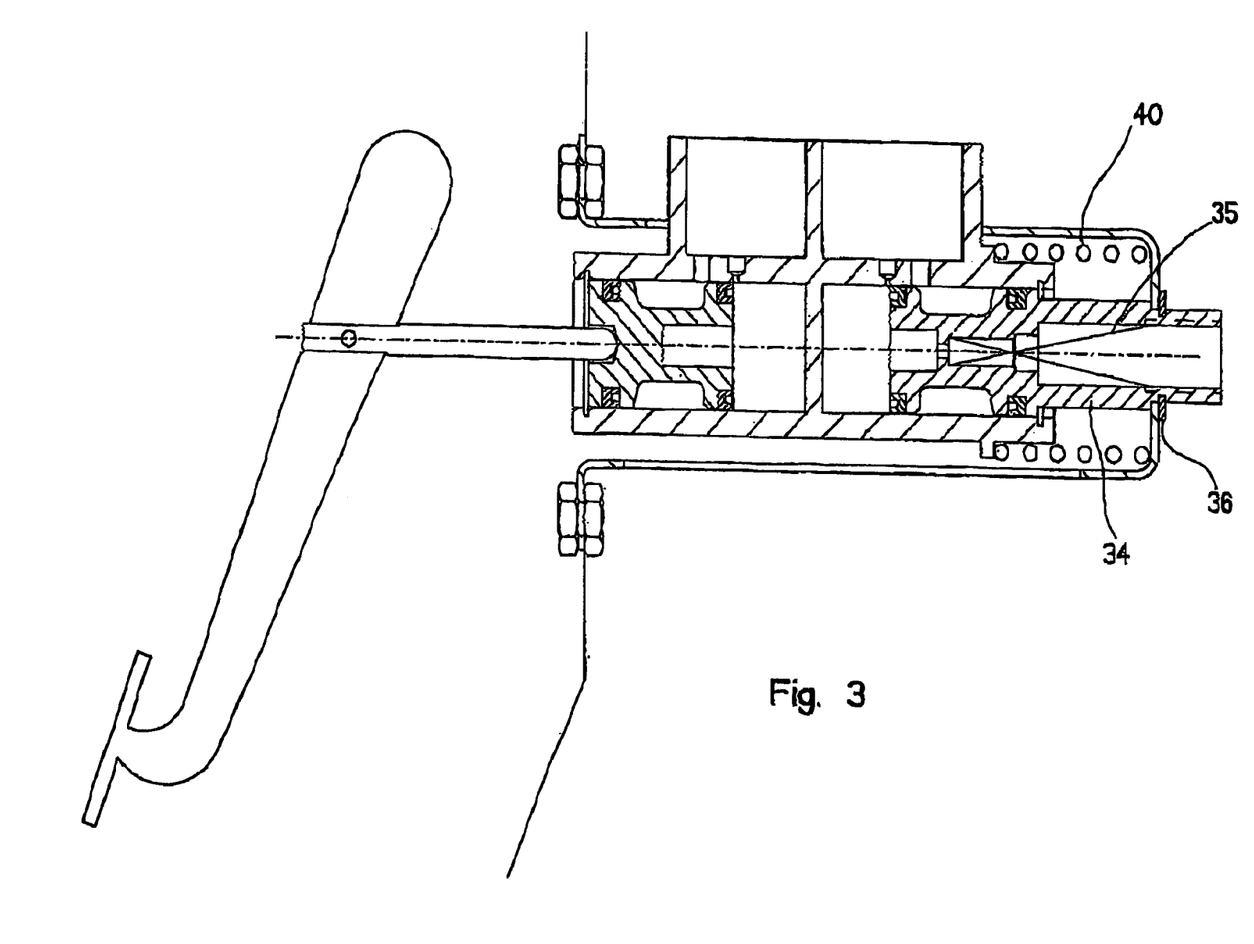
FIG. 3—FIG. 3 shows optional external secondary section piston return spring and a method of incorporation of a fixed proportioning valve and fluid outlet within the secondary piston.

FIG. 3 shows an optional position for the secondary piston 34 return spring 40. Secondary piston 34 is in optional design which allows for incorporation of a proportioning valve or simply a fluid outlet passage 35 through the piston 34. Piston 34 is retained in the carrier 12 by a circlip 36 or any other retention method.

Figure 4:
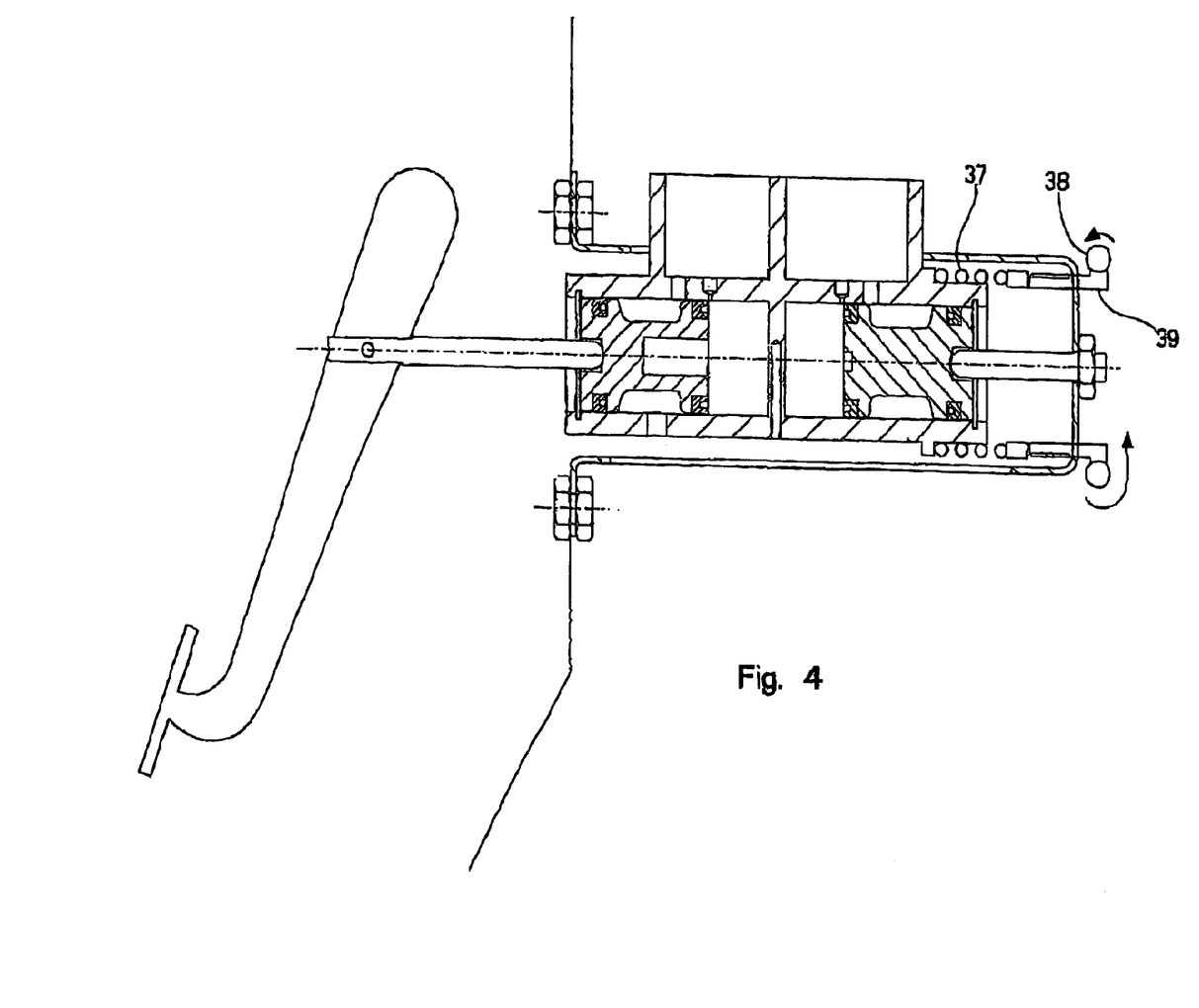
FIG. 4—FIG. 4 shows optional construction method for a variable or fixed proportioning valve.

FIG. 4 shows an alternative design method for proportioning the output pressure from the secondary section. Calibrated coil or disc springs 37 are interposed between the main body 11 and the outer carrier 12. Worm gear 39 is adjustable or fixed depending on the requirement for fixed or variable proportioning. Should variable proportioning be required, the worm gear 39 can be suitably rotated to provide such output pressure by worm 38 attached to a suitable servo-sensing motor mechanism of either electronic or mechanical activation.

Figure 5:
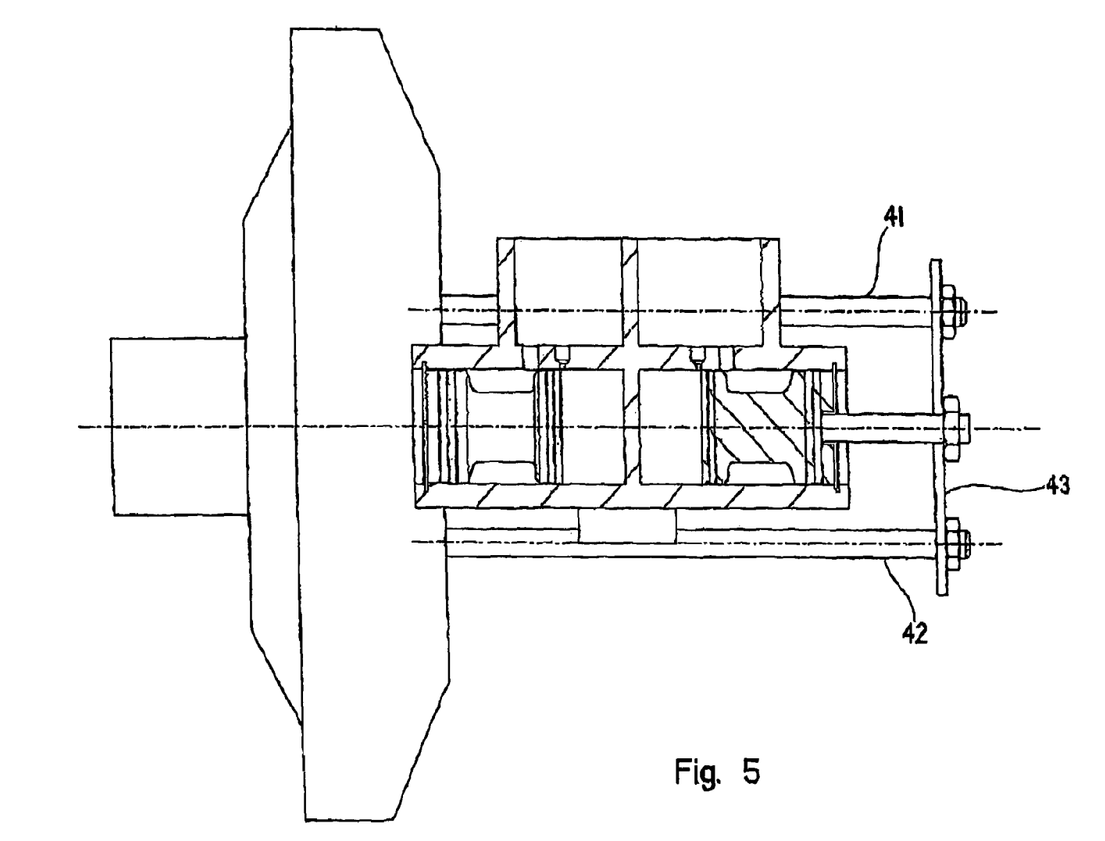
FIG. 5—FIG. 5 shows one method of support and reaction for the Master Brake Cylinder with Opposing Pistons.

FIG. 5 shows one suggested method of support and reaction carrier for the brake master cylinder with opposing pistons. Elongated studs 41 and 42 are built into the brake booster or alternatively attached to the firewall, a simple reaction carrier 43 is attached to the distal end of studs 41 and 42.

Figure 6:
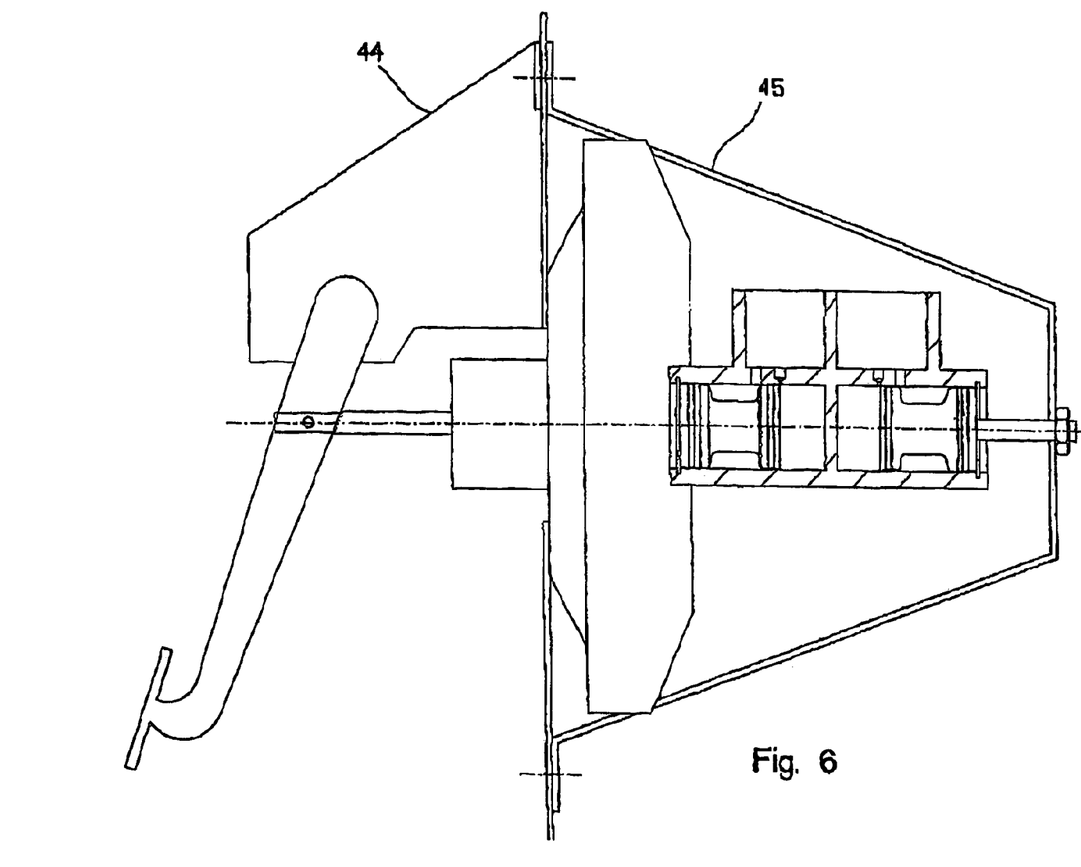
FIG. 6—FIG. 6 shows a total force reaction system for both Master Brake Cylinder and brake booster.

FIG. 6 shows a total force reaction system employing a carrier 45 attached to the brake pedal support bracket 44 thus eliminating tension loads from the brake booster and tandem cylinder.

Figure 7:
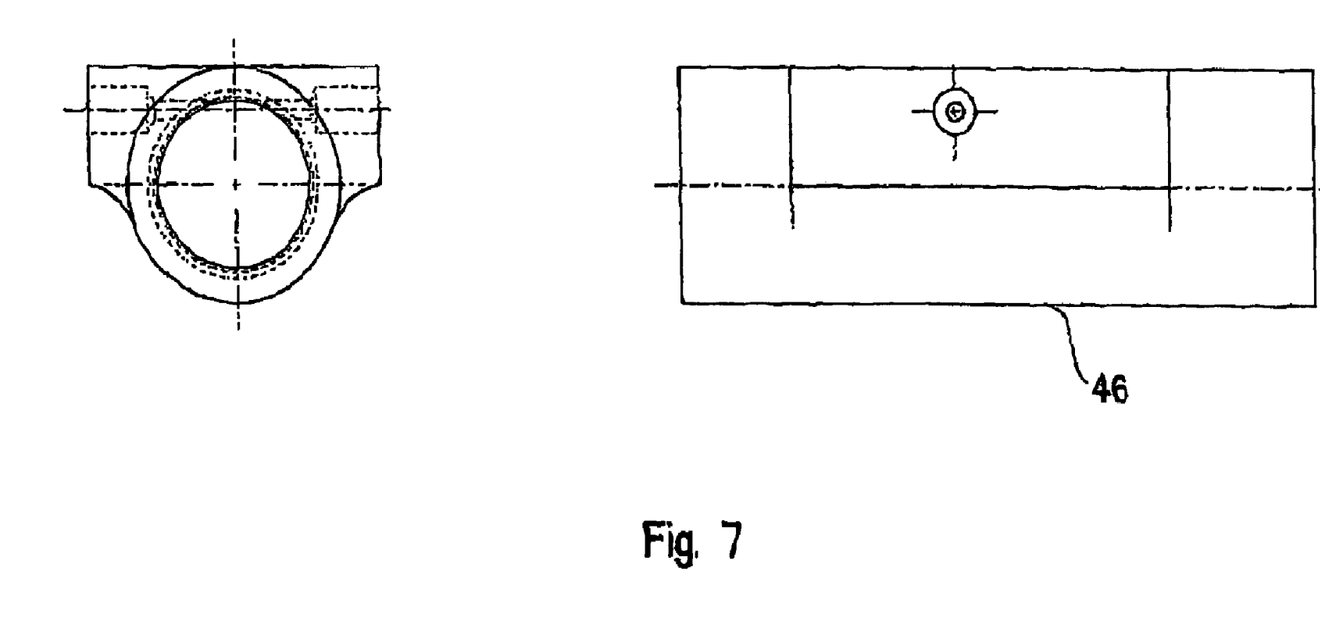
FIG. 7—FIG. 7 shows optional material and construction methods.

FIG. 7 shows a typical cross section of the master cylinder body 46 which may be manufactured from extruded bar stock, simple aluminium casting on a plastic moulding.

While a preferred embodiment of the invention has been shown and described, various modifications as shown in FIGS. 2 to 6, changes in size and shape of parts, changes in materials, etc., will suggest themselves to those familiar with the art, and such modifications and changes are considered to be within the spirit and scope of the invention.

What is claimed is:

1. A master brake cylinder with opposing pistons that provides dual or tandem systems that are completely separate and individual, in a common body with a solid fixed dividing wall, comprising:
   a longitudinally floating main cylinder body with single open bores at opposite ends and a common solid closed dividing wall;
   two piston assemblies with sealing cups or poppets which slidingly work within the bores of the cylinders and when acted upon by an external push-rod force produce hydraulic fluid pressure and displacement for the actuation of brake calipers or drum brakes, so connected to each individual hydraulic system;
   a plurality of springs means positioned within or without of the cylinder bore to return the said pistons to their release positions;
   a retaining mechanism for retaining the pistons within the bores;
   an outer carrier mechanism to provide support for the brake cylinder with opposing pistons and to provide a reaction location for application of the opposed secondary piston to slide within its bore.

2. A master brake cylinder with opposing pistons according to claim 1, comprising of a secondary piston so attached to the reaction carrier and such provided with an axially drilled fluid outlet port.

3. A master brake cylinder with opposing pistons according to claim 2, that encompass a pressure sensitive proportioning valve.

4. A master brake cylinder with opposing pistons according to claim 3, wherein the attached secondary piston arrangement utilizes an external secondary piston return spring.

5. A master brake cylinder with opposing pistons according to claim 1, whereby proportioning of the secondary brake system hydraulic output pressure is regulated by a calibrated spring force interposed between the reaction carrier and cylinder body; and an adjustable mechanism for varying the position of said calibrated spring to alter its force on the cylinder body, thus varying the secondary section hydraulic output pressure to be compatible with the dynamic braking force requirement.

6. A master brake cylinder with opposing pistons according to claim 1, whose main cylinder body is not subject to external force loads but only subject to internal expansion pressure.

7. A master brake cylinder with opposing pistons according to claim 1, wherein a plurality of springs means positioned within or without of the cylinder bore to return the said pistons to their release positions comprise coil springs.

8. A master brake cylinder with opposing pistons according to claim 1, wherein the retaining mechanism is a circlip or cap for retaining the pistons within their bores.

9. A brake cylinder apparatus for vehicles, said brake apparatus having a cylinder with at least two sections with at least two separate delivery connections, at least two pistons being displaced by the action of an operational means, whereby if there is a failure in one of the cylinders or delivery connections or braking components, the action of the remaining pistons in communication with the remaining delivery connections maintains hydraulic pressure to the brakes of the vehicle, wherein the two sections of the cylinder are separated by a solid dividing wall whereby the two pistons are each located in a separate section with each section having a delivery connection associated therewith.

10. A brake cylinder apparatus for vehicles according to claim 9, wherein the pistons are operated by the action of a brake pedal which transmits mechanical force, so the piston's whole force creates hydraulic pressure which communicates with disc brake calipers or drum brakes associated with the vehicle wheels such that each delivery connection is connected via a divided system applicable to the particular vehicle type.

11. A brake cylinder apparatus for vehicles according to claim 9, wherein the brake cylinder apparatus includes a main body portion being generally slidingly received and supported and being able to float longitudinally, the main body portion of the cylinder including the two sections of the tandem cylinder divided by the dividing wall, these two sections being primary and secondary sections within which there is a primary and secondary piston associated.

12. A brake cylinder apparatus for vehicles according to claim 9, wherein the main body portion includes a reaction beam, which forms a reactions point for the secondary piston.

13. A brake cylinder apparatus for vehicles according to claim 12, wherein the reaction beam has an adjustable or fixed stop.

14. A brake cylinder apparatus for vehicles according to claim 12, wherein a first one of the pistons received in a first one of the sections is operated by a first push rod associated with the brake pedal and a second one of the pistons received in a second one of the two sections, and having its action opposed to the action of the first piston, the second piston being operated by a second push rod received at the opposite end by the reaction beam as the main body slides longitudinally against the second push rod following operation of the brake pedal.

* * * * *